US007903550B2

(12) United States Patent
Schmidt et al.

(10) Patent No.: US 7,903,550 B2
(45) Date of Patent: Mar. 8, 2011

(54) BANDWIDTH RESERVATION FOR DATA FLOWS IN INTERCONNECTION NETWORKS

(75) Inventors: Brian K. Schmidt, Sunnyvale, CA (US); James G. Hanko, Redwood City, CA (US); J. Duane Northcutt, Menlo Park, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 408 days.

(21) Appl. No.: 11/829,800

(22) Filed: Jul. 27, 2007

(65) Prior Publication Data

US 2009/0028186 A1    Jan. 29, 2009

(51) Int. Cl.
*H04L 12/28* (2006.01)
*H04L 12/56* (2006.01)
(52) U.S. Cl. .......................................... 370/230; 370/252
(58) Field of Classification Search .................. 709/249; 370/235, 229
See application file for complete search history.

(56) References Cited

U.S. PATENT DOCUMENTS

| | | | |
|---|---|---|---|
| 2002/0146023 A1 | 10/2002 | Myers | |
| 2003/0056014 A1* | 3/2003 | Verberkt et al. ............. | 709/249 |
| 2003/0067872 A1 | 4/2003 | Harrell et al. | |
| 2005/0058151 A1* | 3/2005 | Yeh ................................ | 370/445 |
| 2006/0088119 A1* | 4/2006 | Fu et al. ......................... | 375/265 |
| 2006/0133406 A1* | 6/2006 | Homer et al. ................. | 370/442 |
| 2006/0179392 A1* | 8/2006 | Ota ................................ | 714/749 |
| 2006/0209772 A1* | 9/2006 | Fang et al. .................... | 370/338 |
| 2006/0274713 A1* | 12/2006 | Pandey et al. ................ | 370/346 |
| 2007/0002871 A1* | 1/2007 | Pekonen et al. ........ | 370/395.42 |
| 2007/0053409 A1* | 3/2007 | Reunamaki et al. .......... | 375/130 |
| 2007/0121678 A1 | 5/2007 | Brooks et al. | |
| 2007/0133535 A1* | 6/2007 | Witt et al. ..................... | 370/390 |
| 2007/0263570 A1* | 11/2007 | Alapuranen et al. ......... | 370/337 |

FOREIGN PATENT DOCUMENTS

WO     WO-0041352     7/2000

OTHER PUBLICATIONS

"Invitation to pay additional fees Mailed Nov. 20, 2008 for PCT/US08/69256", (Nov. 20, 2008), Whole Document.
"ISR and Written Opinion Mailed Feb. 10, 2009 for PCT/US08/69256", (Feb. 10, 2009), Whole Document.
Int'l Preliminary Report on Patentability mailed Feb. 11, 2010 for Int'l Application No. PCT/US2008/069256.

\* cited by examiner

*Primary Examiner* — Chi H Pham
*Assistant Examiner* — Soon-Dong D Hyun
(74) *Attorney, Agent, or Firm* — Blakely Sokoloff Taylor & Zafman

(57) ABSTRACT

A method and apparatus for bandwidth reservation for data flows in interconnection networks. Some embodiments of an apparatus for transmitting a data stream include a transmitter to transmit a data stream to a recipient apparatus, the data stream including a plurality of data packets. The apparatus further includes a receiver to receive a response from the recipient apparatus regarding data packet arrival status, and a network unit to direct the operation of the transmitter, the network unit to direct the transmitter to maintain the data stream with a constant bandwidth.

28 Claims, 8 Drawing Sheets

BANDWIDTH RESERVATION FOR DATA FLOWS IN INTERCONNECTION NETWORKS

TECHNICAL FIELD

Embodiments of the invention generally relate to the field of networks and, more particularly, to a method and apparatus for bandwidth reservation for data flows in interconnection networks.

BACKGROUND

A network may include the interconnection of multiple personal electronic media devices. The various media devices may be networked together in order to share data, increase convenience, and make fuller use of each element. For example, certain devices within a home may be connected together. In such an environment, there are multiple potential sources and users of streaming digital media content for audio, video, gaming, and other uses.

When transmitting a data stream through such an interconnection network, it may be desirable to reserve bandwidth for the flow in order to maintain a high quality of service. For example, when delivering a data stream over an Ethernet-based network with other traffic, the total bandwidth capacity may be exceeded, resulting in degraded performance for all traffic sources, including the data stream. If bandwidth reservation is implemented, the data stream generally would only be admitted to the network if there was sufficient bandwidth to, for example, guarantee that no data packets will be lost due to contention for network resources.

However, conventional networking equipment, particularly items targeted to the consumer market, does not generally include support for bandwidth reservation. Further, conventional bandwidth reservation schemes that exist have limitations in operation. Conventional schemes typically require all network entities to implement the scheme in order for it to work, i.e., there usually are no partial failure modes or mechanisms for gracefully reacting to traffic that falls outside of active reservations.

In addition, the reservation of bandwidth typically requires either a centralized arbiter (or server) with knowledge of the network topology that is responsible for servicing reservation requests, or a message exchange protocol between the reserving entities that provides the equivalent functionality of the centralized arbiter in a distributed fashion. The conventional approaches have drawbacks that limit their usefulness and may make implementation impractical in a lightweight network environment. There generally is no standard means to determine the network topology that is in place, creating difficulty in a network in which the topology may not be known. In a system utilizing an arbiter, the availability of the arbiter must be guaranteed to operate, and mechanisms must be provided for handling ill-behaving entities that do not properly relinquish reservations, such as due to a power failure. In a distributed scheme, there is added complexity in that all the communicating entities need to manage the reservation protocol and distributed reservation state. Both such schemes generally rely on assistance from the network infrastructure, such as switches and routers, to obtain capacity information or enforce reservations. Neither of such approaches would generally provide a mechanism for dealing with traffic that falls outside of any established reservation.

SUMMARY OF THE INVENTION

A method and apparatus are provided for bandwidth reservation for data flows in interconnection networks.

In a first aspect of the invention, an apparatus may include a transmitter to transmit a data stream to a recipient apparatus, the data stream including a plurality of data packets. The apparatus further includes a receiver to receive a response from the recipient apparatus regarding data packet arrival status, and a network unit to direct the operation of the transmitter, the network unit to direct the transmitter to maintain the data stream with a constant bandwidth.

In a second aspect of the invention, a network includes a first network device containing a first network interface, the first network device receiving a request for transmission of a data stream, with the data stream including multiple data packets. The first network device is to send the data stream in a constant bandwidth. The network further includes a second network device containing a second network interface, where the second network device is to receive the data stream and is to inform the first network device regarding the receipt of data.

In a third aspect of the invention, a method for reserving bandwidth for a data stream in a network includes establishing a constant bandwidth for transmission of a data stream, where the data stream includes multiple data packets. The method further includes transmitting the data stream to one or more intended recipients, where transmitting the data stream includes transmission of enough extra data packets to maintain the constant bandwidth. The bandwidth is reserved if the transmission of the data stream is successful for a certain period of time.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
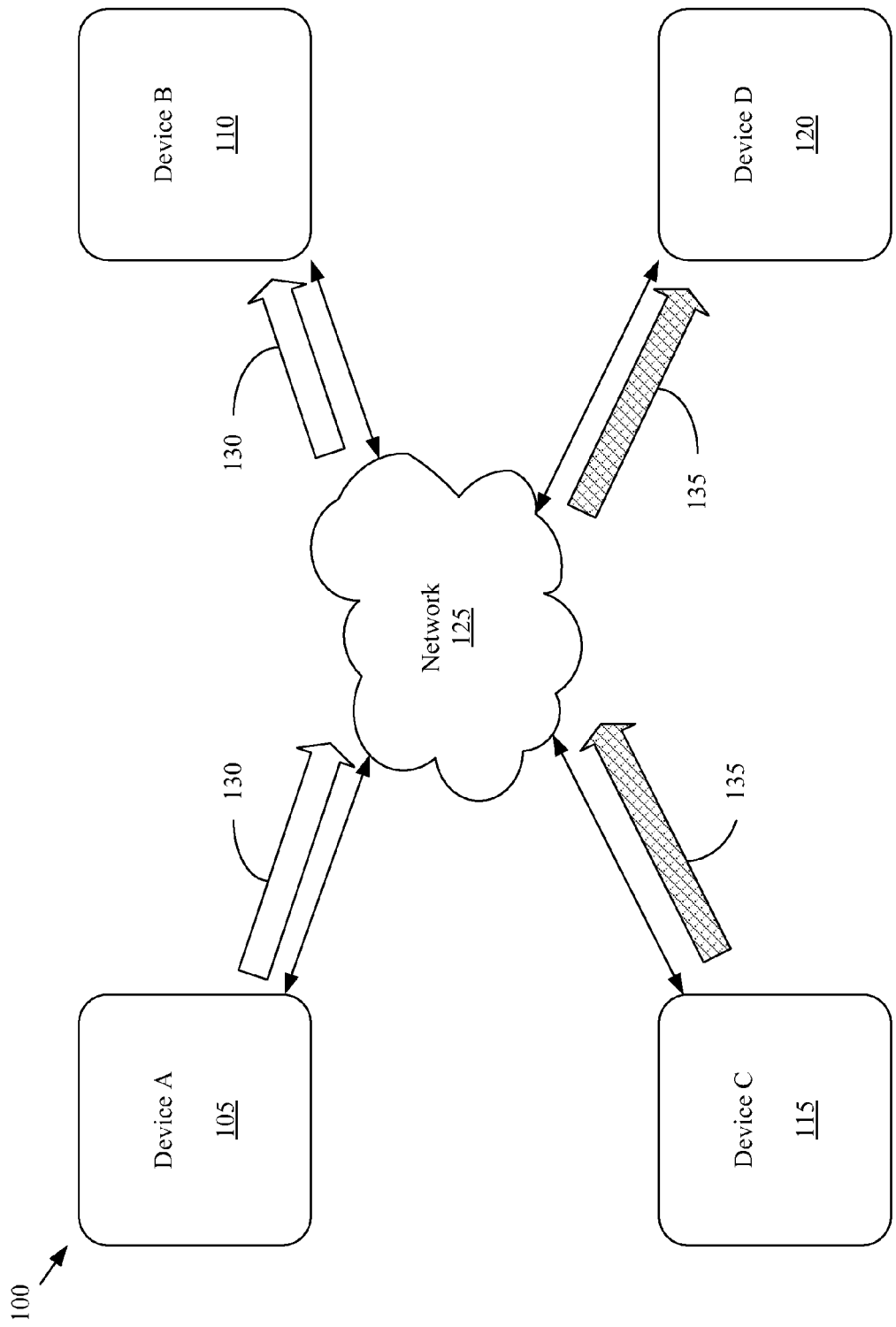
FIG. 1 is a illustration of transmission of data streams in a network.

Embodiments of the invention are generally directed to bandwidth reservation for data flows in interconnection networks.

As used herein, "entertainment network" mean an interconnection network to deliver digital media content (including music, audio/video, gaming, photos, and others) between devices. An entertainment network may include a personal entertainment network, such as a network in a household, an entertainment network in a business setting, or any other network of entertainment devices. In such a network, certain network devices may be the source of media content, such as a digital television tuner, cable set-top box, video storage server, and other source device. Other devices may display or use media content, such as a digital television, home theater system, audio system, gaming system, and other devices. Further, certain devices may be intended to store or transfer media content, such as video and audio storage servers. Certain devices may perform multiple media functions. In some embodiments, the network devices may be co-located on a single local area network. In other embodiments, the network devices may span multiple network segments, such as through tunneling between local area networks. The entertainment network may include multiple data encoding and encryption processes.

In some embodiments, bandwidth reservation is provided in an interconnection network. The interconnection network may include, but is not limited to, an entertainment network in which multiple entertainment media devices are interconnected in a network.

In some embodiments, a source device initiates a data flow reservation request for the network infrastructure by specifying a constant bandwidth required for the data flow. The bandwidth may be, for example, the peak bandwidth for the data flow. If the necessary bandwidth is available, the network infrastructure operates to reserve the bandwidth along the network path in use. In some embodiments, subsequent reservation requests that exceed total capacity on any given link are rejected, with temporary overload conditions during the request process being allowed.

In some embodiments, bandwidth reservation is provided without use of a central arbiter or server, and without coordination or communication between competing network elements. In some embodiments, bandwidth reservation is provided in networking environments in which the network entities that provide and receive data flows possess minimal resources. In some embodiments, bandwidth reservation is provided without requiring a distinguished service to be available for such operations. In an embodiment, a means of establishing bandwidth reservations is provided for a non-federated group of devices with no knowledge of the other entities, the network topology, or the existence of any persistent state. In some embodiments, bandwidth reservation allows for gracefully handling traffic from entities that do not implement or support the reservation process.

In some embodiments, bandwidth reservation can be enforced with varying levels of strictness. For example, if the underlying network provides no enhanced mechanisms, then enforcement may be based upon mutual agreement between network entities. If there is support for packet priorities in the network infrastructure, new reservations and non-participating traffic may be guaranteed not to impinge on reserved flows. If there is support for bandwidth reservations in the network infrastructure, then a bandwidth system may leverage the network infrastructure for enforcement of bandwidth reservation. In some embodiments, a system will operate in call cases, making the system useful for providing bandwidth reservation in an unconstrained network environment.

FIG. 1 is an illustration of transmission of data streams in a network. In this illustration, multiple devices are interconnected in a network, such as a personal entertainment network. For example, device A 105, device B 110, device C 115, and device D 120 are connected to a network 125. There may be any number of devices in the network. In this network, the devices may transfer data streams, such as streaming media data, to other devices in the network.

In one example, device A 105 may be requested to transfer a first data stream 130 to device B 110 over the network 125. However, the network may have limited capacity and thus not be capable of supporting all possible data streams. In this example, device C 115 may also be requested to transmit a second data stream 135 to device D 120. In this instance, the capacity of the network may be exceeded by the simultaneous transmission of the first data stream 130 and the second data stream 135, particularly when either or both of the data streams are at a peak.

In some embodiments, each transmitting device will attempt to transmit the data stream at a constant bandwidth. In some embodiments, the transmitting device will attempt to establish a constant bandwidth that is sufficient to reserve bandwidth for peak transmission. In some embodiments, the operations of other devices on the network will result in reservation of the needed bandwidth without any communication with or knowledge of the other devices transmitting data over the network.

In some embodiments, a first device will attempt to establish the bandwidth of a data stream by transmitting sufficient extra packets in addition to data packets to maintain the peak bandwidth. The extra packets may include null data packets that are included only for maintaining bandwidth, and may include any retransmitted data packets that were not received, speculative or redundant transmission of data packets, or other transmission of non-stream data.

In an example, device A 105 may commence the first data stream 130 to device B 110. If device A is not successful, such as if there is interference that continues for a certain period of time (which may be referred to as a "congestion waiting period"), device A will cease or reduce transmission for a certain waiting period (a "resume waiting period") before attempting again to establish the data stream. If device A 105 is successful for a certain period of time (an "admission waiting period"), then device A 105 will conclude that the data stream 130 is established and has obtained priority. If interference occurs after the data stream is established, such as when device C 115 commences transmission of the second data stream 135, device A 105 will wait a longer period of time (a longer congestion waiting period) than device C 115 before ceasing transmission. In this manner, the later started data stream will be ceased or reduced first, thereby maintaining the reservation of bandwidth for the first started data stream without any communication between the transmitting devices.

In some embodiments, a system provides quality of service assurances to data flows in a standard interconnection network, including a usage scenario in which audio/video data is streamed over a personal entertainment network, such as in a home network environment in which data is streamed a storage device to a display device. In this example, service to the viewer of the audio/video data stream generally will require reliable delivery of the stream data in a timely fashion. However, when the network includes a shared segment for data transmission, other traffic may affect this data delivery. In some embodiments, bandwidth is reserved along the path the data stream takes through the network, regardless of the number and capabilities of networking devices along the path (such as switches and routers). In this manner, the data stream is guaranteed to have sufficient resources to meet its needs and thereby provide reliable and timely delivery.

In some embodiments, the use of maximum demand in bandwidth reservation may result in sub-optimal utilization of network bandwidth, but certain environments, such as in a personal entertainment network, may value quality of service over full system utilization. In such an environment, the bandwidth may be expected to become less expensive thus to expand in the future, while quality of service demands will not decrease.

Figure 2:
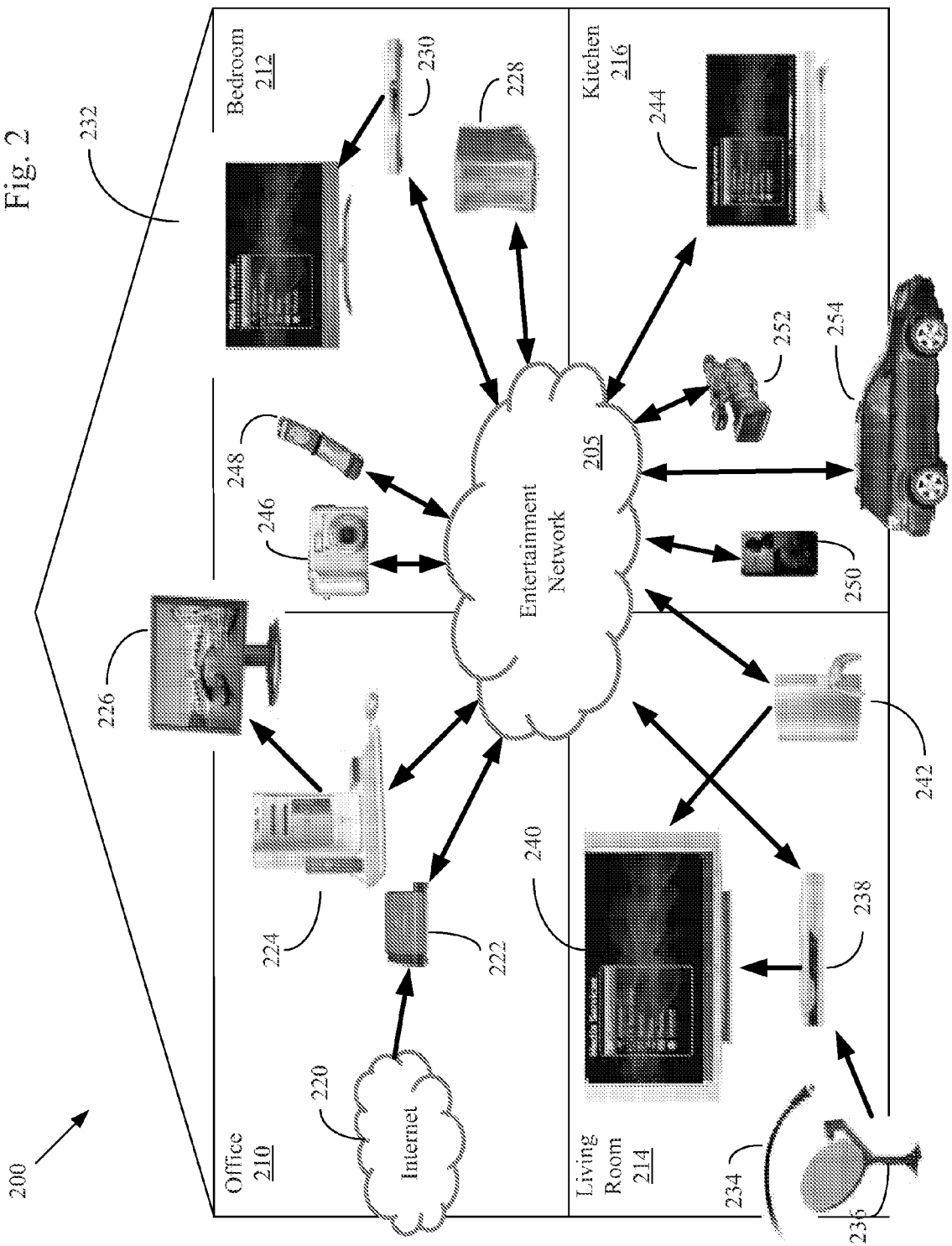
FIG. 2 is an illustration of embodiments of an entertainment network.

FIG. 2 is an illustration of embodiments of an entertainment network. In this illustration, the entertainment network system 200 provides for the connection of any compatible media device to the network. The connection is shown as a connection to entertainment network 205. In some embodiments, the devices operate as network without a central network server. Through the entertainment network, media data streams may be transferred between any of the connected devices. In addition, devices may be controlled remotely through the network. The devices may be connected to the network via any known connector and connection protocol, including coaxial cables, Ethernet cables, and Firewire, and wireless connections via Wi-Fi, Bluetooth, and other wireless technologies.

In some embodiments, the devices may include any media sources or recipients. In FIG. 2, an office 210 may provide an Internet connection 220 via a modem 222 to the network 205. The data received from the Internet may include any streaming media sources, including, but not limited to, purchased audio files (such as downloaded music files), video files (such as movies, television, and other), and computer games. The office 210 may also be connected to a personal computer 224 that utilizes a monitor 226, which may, among other functions, display certain media streams or operate certain computer games.

The entertainment network may also be connected with devices in a bedroom 212, which may, for example, contain a set top box 230 to provide data to a television 232. In addition, the bedroom (or any other space) may contain a media storage unit 228. The media storage unit 228 may receive data from any source connected to the network 205, and may provide to any data recipient connected to the network 205. The media storage unit 228 may contain any type of media stream data for the network.

The system may further include a living room 214 receiving, for example, input from a cable or fiber system 234 or from a satellite disk network 236. The media input from such sources may be provided to a set top box 238 connected to the network 205 and to a second television 240. Also connected to the network 205 for display on the living room television 240 may be a video game unit 242. There may be any number of other rooms with networked devices, such as a kitchen containing a third television 244 connected to the network 205. Other network devices may also be present, including, but not limited to, a stereo audio system that may include speakers placed throughout the house.

In addition, any number of mobile personal electronic devices may connect to the network. The devices may connect via a cable or via a wireless signal, including, but not limited to, Bluetooth, Wi-Fi, infrared or other similar wireless communication protocol. Each such protocol may require an interface to the network (which are not shown in FIG. 2), such as a Wi-Fi base station. Such mobile personal electronic devices could include a digital camera 246, a cellular telephone 248, a personal music device 250, or a video camera 252. In addition, a mobile system contained in an automobile 254 may connect to the network 205 when the automobile is in close proximity to the network (such as when present in a garage of the house). The mobile personal electronic devices may, for example, automatically connect to the network when within range of the network. While connected, the devices may be available to obtain data through the network or to provide data to the network, including possible automatic updates or downloads to the devices. In one example, a user may be able to access the data contained in any of the mobile electronic devices through the network, such as accessing the photographs stored on the digital camera 246 on the living room television 240 via the set top box 238. In some embodiments, the network devices illustrated in FIG. 2 are low resource devices that have been designed with limited network processing and buffering capabilities.

In some embodiments, in order to reserve bandwidth, a network device fully utilizes the maximum bandwidth in the reservation request at all times. The maximum bandwidth may be equivalent to or based upon a peak bandwidth for the data stream. The device may be aware of the peak bandwidth, or the peak bandwidth may be obtained from one of various different sources. In some embodiments, a transmitting device generates network traffic at a uniform rate such that the total bandwidth of the data flow matches the bandwidth request. A data flow may have varying and bursty bandwidth demands, as is typical for audio/video streams. In some embodiments, a grooming service generates additional traffic when the flow data bandwidth is below the maximum in order to pad the transmitted bandwidth out to the maximum. In some embodiments the grooming service further controls the delivery rate to smooth out the bursts.

In an example, audio/video data may be delivered using the RTP/UDP/IP (Real-Time Transport Protocol/User Datagram Protocol/Internet Protocol) protocols. In this case, the reservation groomer transmits data packets that are associated with the data flow from the source, such as, for example, a video storage server, and is required to transmit a particular number of bytes at fixed intervals. When the groomer receives a packet from the source, the groomer may transmit the packet immediately or hold it until the next transmission interval, depending on the particular application. When the groomer reaches a transmission interval and has a bandwidth deficit, it generates a packet of a size necessary to maintain the desired bandwidth and transmits it to maintain the full bandwidth.

In an example, audio/video data may be delivered using TCP/IP (Transmission Control Protocol/Internet Protocol) protocols. TCP typically can pass through routers and firewalls, where UDP is typically disallowed. However, TCP does not allow the specification of a delivery rate. In some embodiments, the reservation groomer may provide the same functionality as described above with regard to maintaining a constant and uniform bandwidth, but implements a non-standard implementation of the TCP protocol that integrated the groomer into the implementation.

In some embodiments, a transmission according to a network protocol occupies, and therefore reserves, bandwidth across all links and devices along the path of a data flow through the network, with the bandwidth occupation being accomplished by a network device without any knowledge of the topology or capabilities of the network infrastructure. In some embodiment, standard networking protocols may establish the flow through the network without special support. Most modern network traffic is based on the TCP protocol, which has the property that it consumes bandwidth only up to the limit of what is available. In some embodiments, by occupying the maximum required bandwidth, a data flow insulates itself from TCP traffic. In a local area network, unconstrained UDP traffic may be allowed, but in such an environment the traffic may be required to follow the reservation scheme for the interconnection network.

Figure 3:
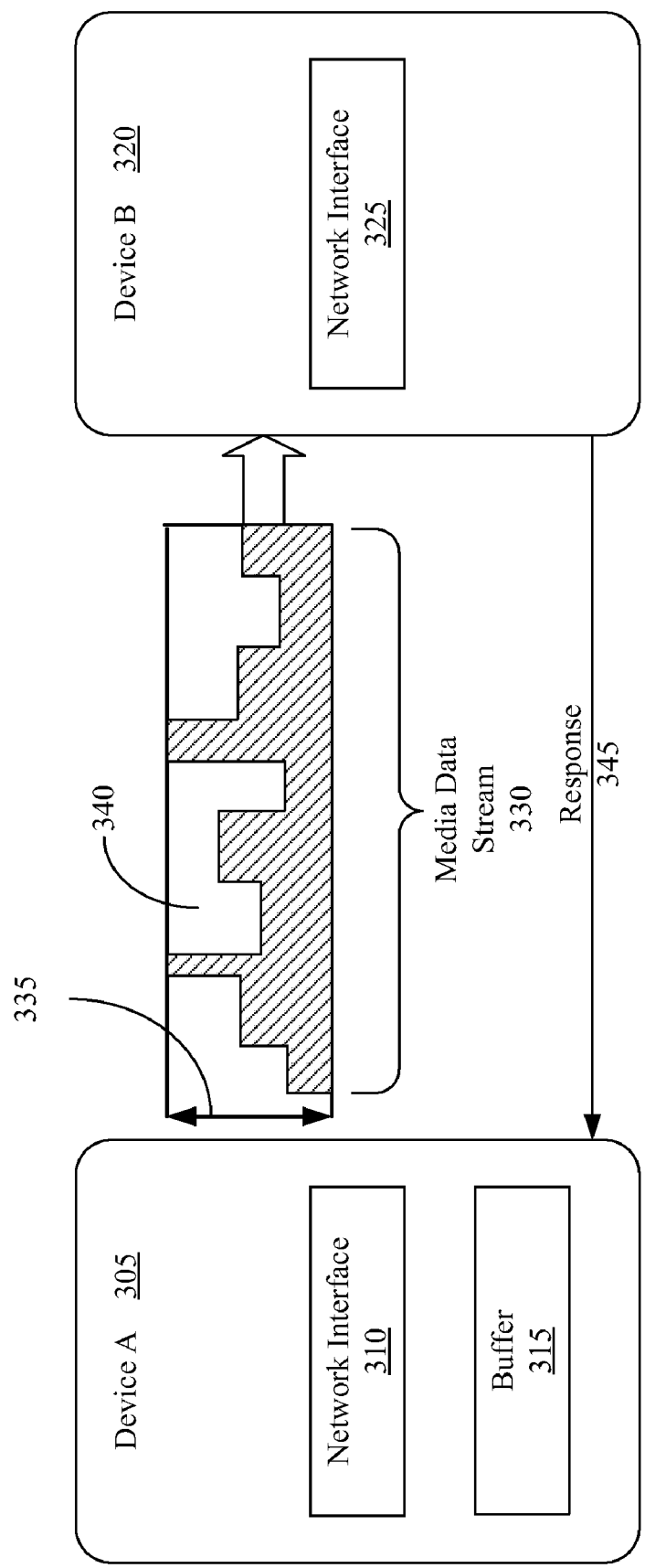
FIG. 3 is an illustration of embodiments of transmission of a media data stream between devices in a network.

FIG. 3 is an illustration of embodiments of transmission of a media data stream between devices in a network. In this illustration, device A 305 includes a network interface 310 and a buffer 315. The buffer 315 may include the storage of data packets that have been transmitted. Device A is intended to transmit a stream of media data to device B 320, which as illustrated also includes a network interface 325 and a buffer 330. The buffer 330 may include the storage of data packets that have been received from device A 305. Device A 305 and device B 320 may be connected in an entertainment network.

In some embodiments, the media data stream 335 may include various peaks and troughs of transmission, as the data packets to be transmitted may vary over time. In some embodiments, device A 305 will "pad" the media data stream with additional data packets 340 to maintain a certain bandwidth. In some embodiments, the bandwidth 340 will be at least as large as a peak of the media data stream 335 such that the transmission will consist of a constant data stream that will accommodate peak transmissions of data. However, other bandwidth levels may also be chosen. The additional data packets 340 may include null data packets that contain no data or may include retransmitted packets, duplicate packets, or other useful information. The additional data packets 340 may also include any data packets that need to be retransmitted because of the failure of such data packets to be received by device B 320. Device B may send responses 350 to device A 305. The responses 350 may include positive acknowledgements (ACKs) sent when data packets are received, or negative acknowledgements (NAKs) sent when expected data does not arrive.

Figure 4:
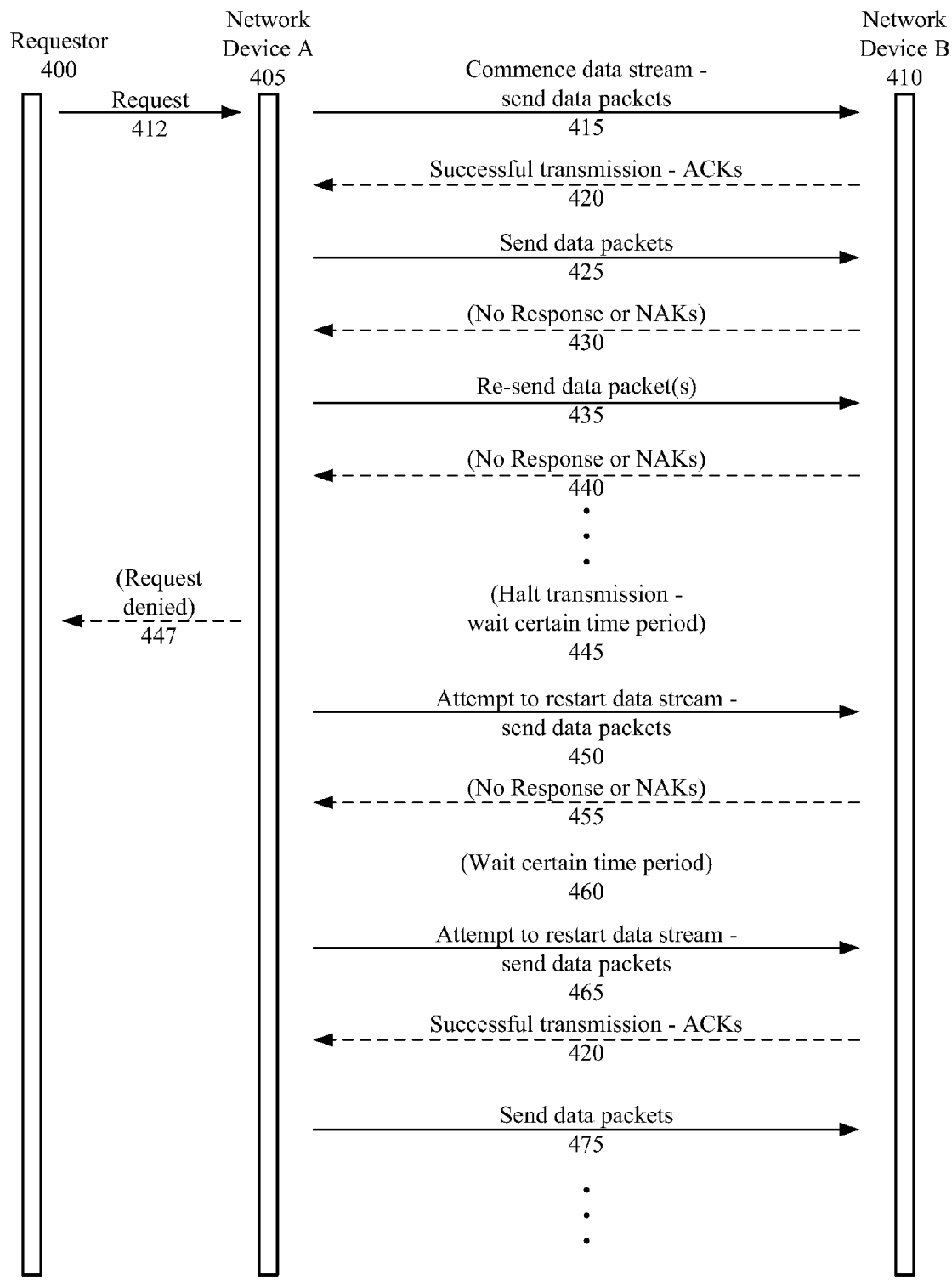
FIG. 4 illustrates some embodiments of communications between network devices to provide bandwidth reservation.

FIG. 4 illustrates some embodiments of communications between network devices to provide bandwidth reservation. In this illustration, a requester 400 sends a request 412 to network device A 405 requesting that a media network data stream be transmitted to network device B 410. Network device A 405 commences the data stream by sending data packets to network device B 410, with the transmission of data packets being commenced at a certain bandwidth that is sufficient to maintain peaks in the data transmission, with any remaining bandwidth space being filled with extra data packets as required. Device B 410 may indicate successful transmission by providing sufficient positive acknowledgements (ACKs) in response to arrival of data packets or otherwise indicating that such data packets have arrived.

However, network device A 405 may transmit additional data packets 425 which are not received by network device B 410, such as because the network has become over congested, because a transmission line has been lost, or for any other reason. In some embodiments, network device A 405 may re-transmit the missing data packets 435 to network device B 410. If the transmission continues to be unsuccessful 440 for a certain period of time 440 (a congestion waiting period), network device A 405 will cease or reduce transmission of the data stream and wait for a certain period of time 445 (a resume waiting period). If the bandwidth is not reserved, there may be a message to the requester indicating that the reservation request for the data stream is denied 447. After the time period has expired, network device A attempts to resume the full transmission of the data stream 450. In this instance, the attempt is again unsuccessful 455, resulting in waiting another time period 460. In some embodiments, the waiting time is varied to prevent two devices attempting to reserve bandwidth at the same time, and then retrying at the same time. In this example, network device A attempts again to reestablish the data stream 465, is successful 470, and continues with the transmission of data packets 475.

In an embodiment of the invention, admission control is provided for data flows that interfere with data flows that have been established. For, a new data flow is opened at the desired bandwidth, utilizing data grooming as described above. In some embodiments, the network infrastructure will automatically route the flow to the desired destination and reserve bandwidth along the way by occupying the bandwidth. However, along one or more parts of the data path, the new data flow may cause a data overflow situation to occur.

Because network devices lack infinite data queues, the devices will eventually drop data packets in response to an overload situation. In some embodiments, the receiver is responsible for detecting this situation and informing the sender. If the carrying protocol is groomed TCP, such feedback will be inherent in the underlying protocol. If the carrying protocol is UDP, then a back channel may be established to send the overload indication to the data source. In some embodiments, the overload detection algorithm and feedback protocol/channel may be application-specific. When the carrying protocol is TCP, a separate feedback algorithm and channel may still be used if desired.

In some embodiments, when a recently initiated flow receives an overload indication, the transmitting device will cease or reduce transmission in a short time (and thus the device has a shorter congestion waiting period), and will provide an indication to the reservation requester that the data request was denied. In this scenario, none of the entities with active flows are required to communicate in order for the new flow to be either admitted if there is sufficient bandwidth or rejected by the network if there is insufficient bandwidth. Thus, no knowledge of other data flows is required. In some embodiments, each data flow requester, in concert with the data flow target, is able make its decision based upon only local information.

In some embodiments, when a data source attempts to initiate a new data stream and its reservation request is denied, the source may periodically retry to admit its data stream. To avoid "livelock" situations in which two (or more) requesters make simultaneous attempts and repeat such attempts, the delay between requests may be randomized so that each requester waits a random time period, allowing one of the requesters to gain priority over the other requester or requesters. In one example, a small random multiplier, such as 1.x times, may be applied to the time period.

Waiting periods may vary in length and in method of establishment in different embodiments. In some embodiments, the length of admission, congestion, and resume waiting periods may be universal in length for each device and type of data. In some embodiments, the length of waiting periods may be selectable and may be modified by, for example, a transmitting device. In some embodiments, a waiting period may include a randomization factor, or may be adjusted by a randomization factor, so that different devices may cease or reduce data streams or resume data streams at different times. The reaction for a device will be limited by a minimum wait period and a maximum randomization interval. A transmitting device may select the waiting periods depending on the particular transmission. In some embodiments, the length of waiting periods may vary depending on the type of data source, the type of data being transmitted, or other factors. In one example, a longer admission waiting period may be utilized to establish a higher level of reservation priority for a data stream. In other examples, differing congestion waiting periods may be established for different types of data or different types of network devices to provide varying priority levels, such as a shorter congestion waiting period being established for a first data stream containing low priority data and a longer congestion waiting period being established for a second data stream containing high priority data.

In some embodiments, a requester may also choose to incrementally increase its data stream reservation. For example, a source device may begin by requesting a small bandwidth reservation. It may then increase the bandwidth of its active flow in a sequence of, for instance, fixed quanta, such as an attempt to increase the reservation by 5 Mb/s every few seconds until a maximum data flow level is reached. This process may enable a data flow source to perform a slow start of its data flow, thereby allowing it to discover the maximal flow rate available or to minimize the effects on the system during an overload.

In some embodiments, a data flow source may wish to enhance its data flow with extra data above the maximum flow to provide sufficient additional bandwidth for certain purposes. For example, the bandwidth may be reserved for additional requirements, such as to provide for entering trick play mode (fast forward, reverse, pause, etc) for an audio/video stream, or for changing channels on a digital tuner device.

In some embodiments, the same admission control processes would apply to an incremental change to a reservation as apply to a new data flow reservation. In such processes, if an increase in data flow results in the target sending overload feedback, then the incremental increase is rejected, and the data flow source falls back to its last granted request.

In some embodiments, the bandwidth reservation protocol guards a bandwidth reservation against other common data traffic. In some embodiments, the data flow process may be enhanced to improve the overall quality of service for each active flow. In some embodiments, if the network infrastructure supports packet priorities (which may become more common), then traffic in active flows may be further protected from being dropped during overload. For example, active flows could be assigned the highest packet priority, background traffic could be assigned a normal priority level, and new reservation request packets could be assigned a lower priority. In this example, active data flows generally would not experience a lower quality of service due to admission control activity or due to the other background traffic (such as web surfing on a PC).

In some embodiments, another technique used to absorb the deleterious effects of packet loss during an overload (when a new flow is attempting to make a reservation) is the padding of the reserved data flow with extra bandwidth beyond the reservation request, i.e., beyond the expected maximum in data requirements. Padding beyond such data requirements may reduce the likelihood that valuable flow data will be lost and provides some additional headroom for the data flow source to re-transmit lost data. In some embodiments, if packet priorities are available, this extra padding may be marked to be dropped first as needed.

The extra data packets generated by the data flow groomer to maintain the bandwidth may be used to improve the quality of service. In some embodiments these packets may contain null information, and in certain other embodiments the extra data packets may contain redundant flow information. If flow data is lost and extra data packets contain redundant information, the lost data might be recovered from these extra packets.

In some embodiment, a data flow groomer does not need to comprehend the format of the flow data in order to generate extra bandwidth or meaningful flow data. In an example, the extra packets may be transmitted on a separate port to the same target.

In some embodiments, the granularity at which the data flow groomer meters out its bandwidth may be utilized to affect the overall signal quality. Decreases in the interval over which the target bandwidth is maintained may provide a more uniform delivery rate, which is better at reserving resources in the network infrastructure because buffer occupancy exhibits less fluctuation, thereby decreasing the opportunity for transient overload. Thus, finer timing in the data flow groomer may be provided to improve quality of service.

Further, in some embodiments, the groomer may choose to delay transmitting incoming data from the source in order to improve the uniformity of the stream. However, certain data flows may require clock recovery at the target, which may preclude this type of optimization. In some embodiments, both such modes of data transmission—with delay in transmission and without delay in transmission—are supported in a network unit.

In an unconstrained network, even a granted reservation may experience overload as the result of factors other than a flow admission request. This may be the case if the network path of the flow is altered (for example, circumstances due to moving or disconnecting cables on network devices), or if non-conforming traffic is present on the network (such as a network application that does not follow TCP protocol or the admission control protocol). Thus, active flows may not be able to rely solely on the success of the admission control protocol to guarantee that a reservation will be honored in every circumstance.

When a set of active data streams experiences an overload, the data streams will generally all be degraded uniformly if no action is taken, thereby degrading system performance. In some embodiments, the first action in response is to attempt to use existing protocols to force the non-conforming source of traffic to quiesce. For example, the ICMP (Internet Control message Protocol) protocol may be used to request that non-conforming devices squelch their transmission. However, active streams may be required reduce their bandwidth in some fashion. Typically, it may be more desirable to abandon a single flow rather than degrade all flows. Thus, active flows may be directed to select a flow to victimize. In some embodiments, this may be accomplished as follows:

(1) First, an active flow that receives an overload feedback notification waits a certain period of time (a congestion waiting period) sufficient to account for a new flow requesting admission.

(2) If the overload persists, each active flow experiencing overload waits a random amount of time (a randomization factor) and then tests again for overload.

(3) If overload persists, the data flow reduces its bandwidth, which may include ceasing the data stream or switching to a lower bandwidth version of the data stream. In this manner, the sources of the data flows need not communicate with each other, but the randomization makes it likely that only one flow will cease or be reduced.

(4) When an active flow loses its reservation as above, it should periodically attempt to re-acquire its reservation (after a resume waiting period), randomly varying the delay between requests, pursuant to a randomization factor.

Figure 5:
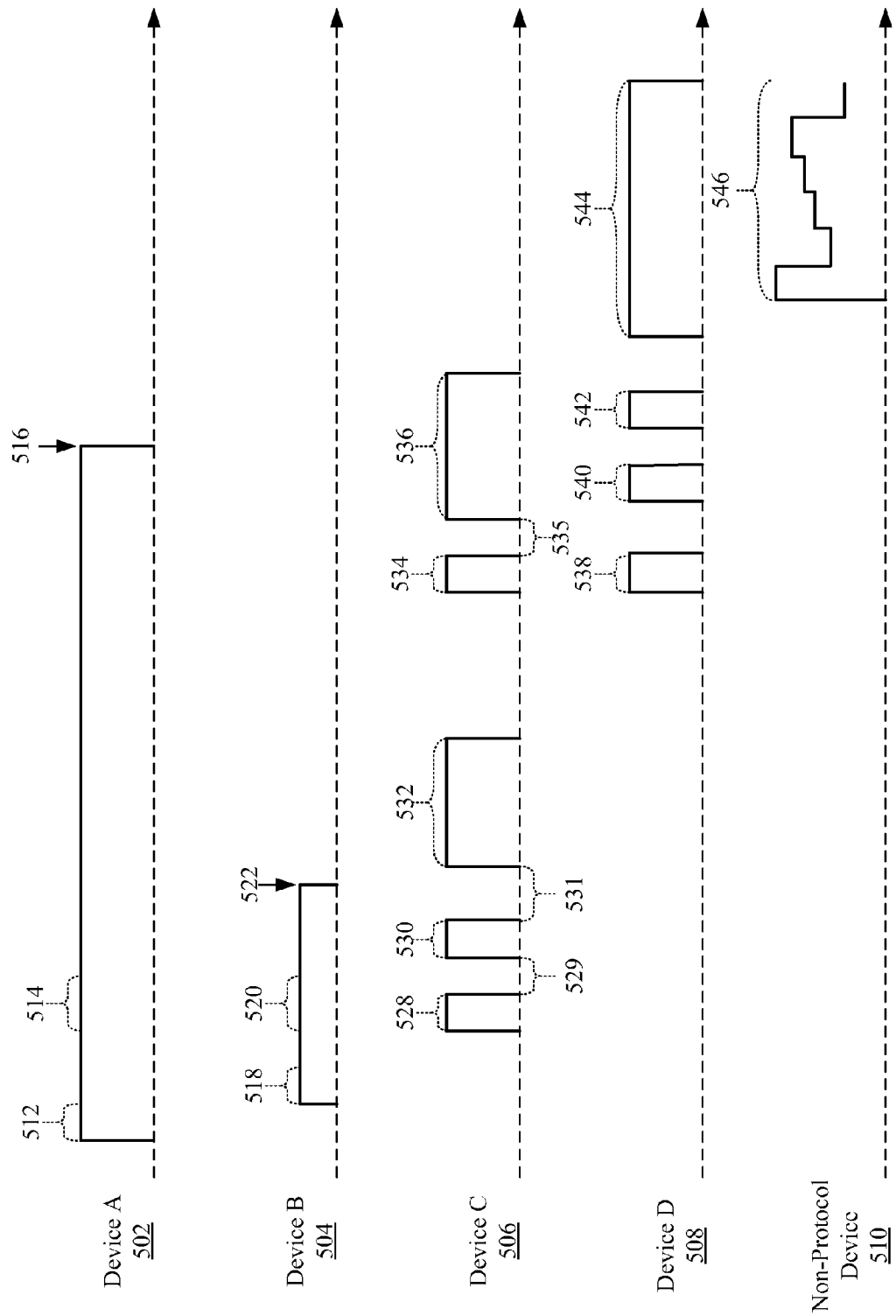
FIG. 5 illustrates embodiments of data transmission by multiple devices in a network.

FIG. 5 illustrates embodiments of data transmission by multiple devices in a network. In this illustration, devices operating according to a network protocol seek to reserve bandwidth for transmission of a media data stream by attempting to transmit a stream that that is sufficient in bandwidth for any peaks in data transmission requirements. Devices encountering a situation in which bandwidth availability is insufficient to carry the data stream will encounter data packets that do not arrive, and will cease or reduce data transmission before devices with established bandwidth will cease or reduce transmission.

For example, device A 502 begins transmission of a media data stream (with the bandwidth being represented by the height of the bar illustrated in FIG. 5). If the transmission is successful, indicating that sufficient data packets are being received by the recipient, for a particular initiation time period 512, then device A 502 determines that the bandwidth is established. In this operation, device A 502 may not be aware how many other devices, if any, are transmitting or attempting to transmit data in the network, but rather device A 502 is able to make the determination based on the success or failure of its own data transmissions.

Device B 504 then attempts to establish a media data stream, and thus to reserve bandwidth for the data stream. In this example, the network is capable of carrying the data streams of both device A 502 and device B 504. After an initiation time period 518, device B 504 determines that the data stream of the device is established. However, device A 502 and device B 504 may not be aware of each other or that each device has reserved bandwidth for transmission of data streams. However, when a third device, device C 506, attempts to establish a media stream, the network in this example may be unable to reliably carry all of the needed data. Each active device may encounter interference in transmission of data packets, and each such device will cease or reduce transmission if the reception problems persist for longer than a certain period of time. In some embodiments, device A 502 and device B 504 wait a longer period 514 and 520 before ceasing or reducing data transmission than the period 528 that device C 506 will wait because device A 502 and device B have determined that their data streams have been established and device C 506 has not. In some embodiments, device C will wait a certain time period 529 before attempting to initiate the data stream again. In some embodiments, the length of time period 529 is random. Because devices A and B 502-504 are still transmitting, it is expected device C 506 will again be unsuccessful and cease or reduce data transmission after time period 531. At time 522 device B ends its transmission, and, because sufficient bandwidth is available, after time 531 device C 506 is successful in initiating the media data stream for a certain period 532.

In this illustration, device C 508 and a device D 538 later attempt to initiate transmission at the same time. However, device A 502 is still transmitting and it may be assumed in this example that there is sufficient bandwidth for two of the devices but insufficient bandwidth for all three devices. In some embodiments, both device C 506 and device D 508 will cease or reduce transmission after a time period 534 and 538. If both devices waited the same time period before attempting to reinitiate transmission the two devices could continue cycling together and neither would be able to transmit at full bandwidth. In some embodiments, the length of the waiting period is random or nearly random (between a minimum and maximum period length). For example, device C 506 may receive a shorter random waiting time 535 than the random time period 539 for device D 508. Device C 506 then is able to reserve bandwidth for the transmission period 536 while device D continues to attempt and fail 540 and 542 until sufficient bandwidth becomes available. (The time period for waiting may be determined based on other factors in some embodiments. In some embodiments, network devices may be accorded relative priorities, and higher priority devices may be accorded a shorter time period than lower priority devices.)

In some embodiments, network devices A-D 502-508 may need to share network resources with one or more non-compliant devices 510, which are devices that do not utilize the network bandwidth reservation protocol. If the non-compliant device used another protocol such as TCP, the device will generally reduce bandwidth when data transmission is inadequate, such as in competition with device D 508 for bandwidth 544, and then will gradually increase bandwidth 546. In some embodiments, the network devices may work in conjunction with such devices. However, if the device does not reduce bandwidth in such occurrences, then a user may be required to avoid such devices. In some embodiments, a network device may send a message on the network intended to warn non-compliant devices and request that such devices end transmission or reduce bandwidth to allow operation by the network device.

Figure 6:
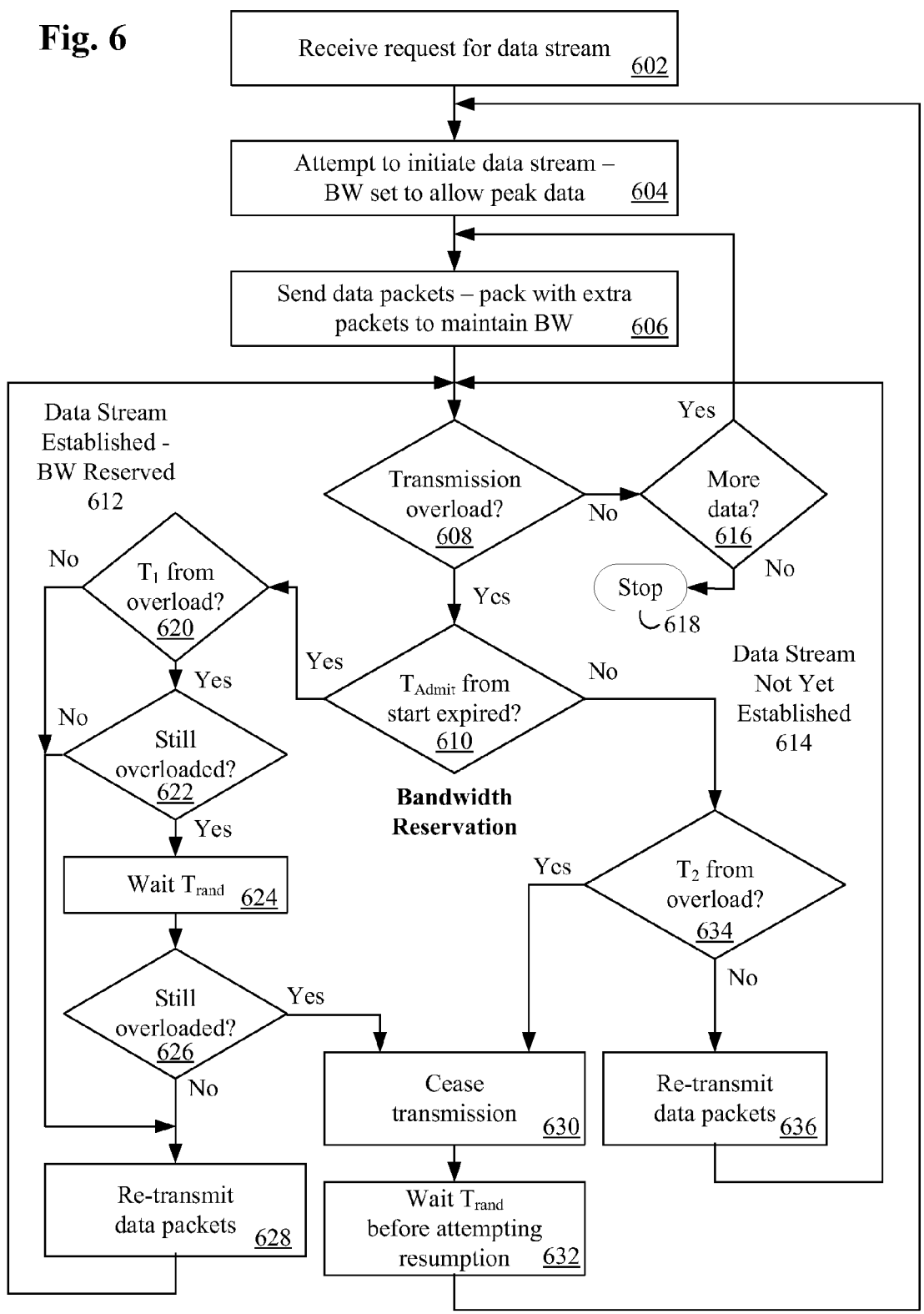
FIG. 6 is a flowchart to illustrate embodiments of a process for reserving bandwidth for transmission of a data stream in a network.

FIG. 6 is a flowchart to illustrate embodiments of a process for reserving bandwidth for transmission of a data stream in a network. The process may be triggered by receipt of a request for a data stream 602. The device receiving the request will attempt to initiate the data stream 604, utilizing a transmission bandwidth that is sufficient to accommodate peak data transmission. The device will transmit one or more data packets, with the transmission packed with extra packets, such as null packets, to maintain the reserved bandwidth 606.

If the transmission of the data stream is not overloaded 608, with the data packets generally being received by the intended recipient or recipients, and there are more data packets to transmit 616, then the process continues with the transmission of data 606. If there is no more data to transmit, then the data stream ends 611. If the transmission is overloaded 608, then there is a determination whether sufficient time has expired since the commencement of the data stream ($T_{Admit}$) 610 (an admission waiting period) to determine that the data stream has been established and the bandwidth has been reserved 612. If enough time has not elapsed, then the data stream is not yet established 614.

If the data stream has been established 612, then there is a determination whether a time period $T_1$ has expired since the overload condition started 620, where $T_1$ is a congestion waiting period during which a network device attempts to maintain the data stream by retransmitting data. If $T_1$ has not expired, then there is an attempt to retransmit the data packets that have not arrived 628, followed again by a determination whether the transmission is overloaded 608. If $T_1$ has expired 620, then there is determination whether the transmission is still overloaded 622. If not, then there is a retransmission of the missing data 628. If transmission is overloaded, the device waits a random time period $T_{rand}$ before attempting to resume the data transmission 624, with the random time period allowing a choice to be made between multiple reserved data streams. There is then a determination whether transmission is still overloaded 626. If not, the process can continue with retransmitting missing data packets 628. If so, then the data stream ceases or reduces transmission 630 and waits a random time (between a minimum time and a maximum time) $T_{rand}$ before attempting to resume the data transmission 632.

If the data stream has not yet been established 614, then there is a determination whether a time period $T_2$ has expired 634, where $T_2$ is a time period during which a network device attempts to maintain the data stream. In some embodiments, $T_1$ is greater than $T_2$ so that the established data stream or streams continue to attempt to transmit data longer than non-established data streams, thereby maintaining the reserved bandwidth. If $T_2$ has not expired, then there is an attempt to retransmit the data packets that have not arrived 636, followed again by a determination whether the transmission is overloaded 608. If $T_2$ has expired 634, then the data stream ceases or reduces transmission 630 and waits a random time $T_{rand}$ before resuming 632.

While not illustrated here, a network device may also limit the number of times the network device attempts to reinitiate a data stream. If re-initiation has not occurred after a certain number of attempts or during a certain time period, the network device may cease operation. This may be appropriate to prevent continuing attempts to initiate or re-initiate the data stream when sufficient bandwidth isn't available for an extended period of time.

Figure 7:
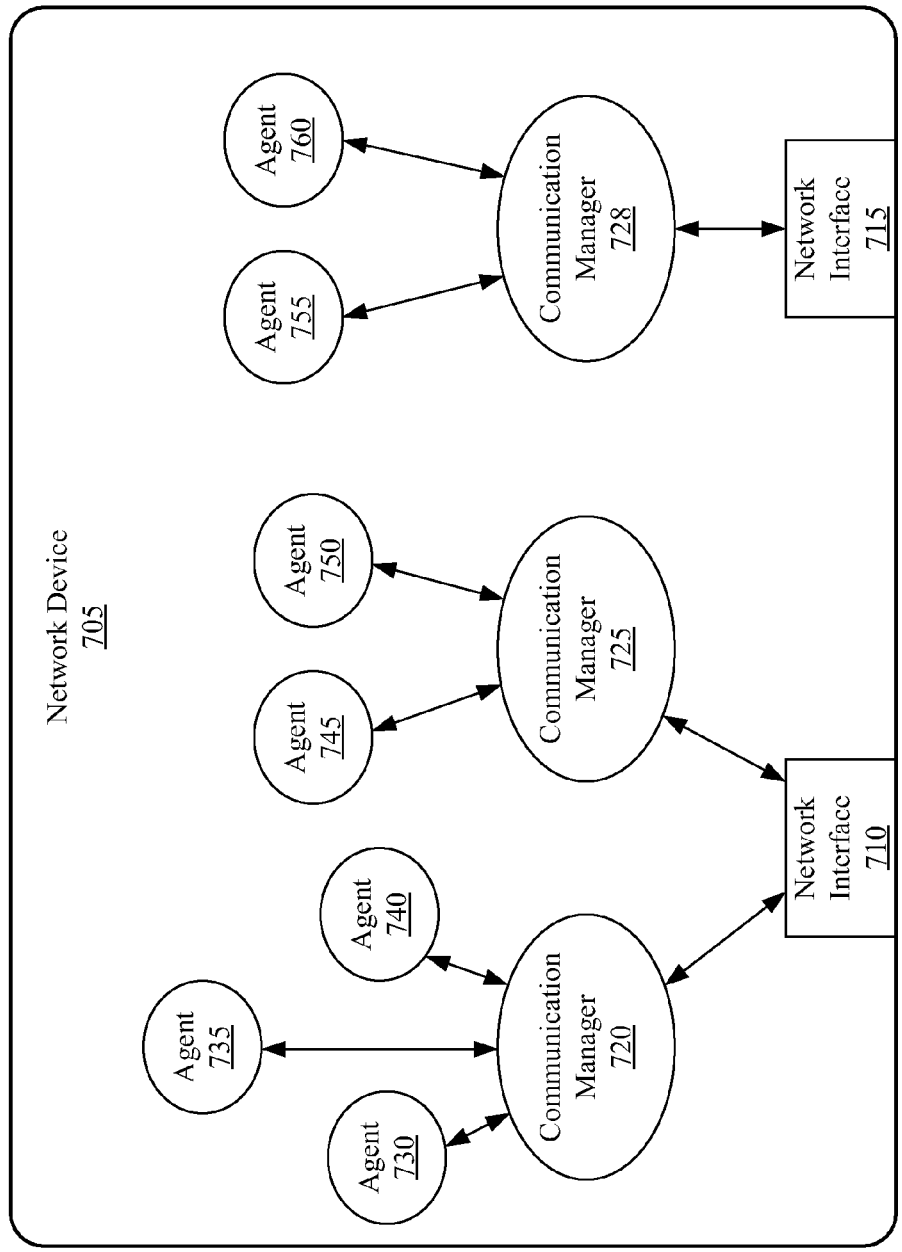
FIG. 7 is an illustration of embodiments of a network device.

FIG. 7 is an illustration of embodiments of a network device. In some embodiments, a network device 705 is an entity with at one physical network interface, such as an Ethernet MAC address. As illustrated in FIG. 7, the network device includes two network interfaces 710 and 715. In some embodiments, network device thus is a physical entity. In some embodiments, the network device includes one or more agents, with each agent being a logical entity that resides on a network device. There may be multiple agents on a network device. For example, FIG. 7 illustrates a network device 705, with network interface 710 providing access to agents 730, 735, and 740 via communication manager 720 and agents 745 and 750 via communication manager 725, and providing access to agents 755 and 760 via communication manager 730. In some embodiments, each agent is assigned a globally unique identifier to distinguish it from other agents, independent of the network device IP address and across device reset operations. In this manner, a command that is intended for agent 755 may be addressed to the unique address for the agent, and the message will then be directed through network interface 715 to agent 755.

In some embodiments, agents serve as endpoints of communication within a network device, and provide a particular set of capabilities and associated behaviors. Agents may include media sources, media sinks, media controllers, and other elements. In one example, an agent may provide a video streaming service. In this example, the agent responds to messages to query and control media streams, and, when instructed, the agent may autonomously deliver a media stream to another agent. In some embodiments, an agent has no more than one active media session at any time, thus providing for relatively simple operation. An agent may be viewed may be described as acting as an active object in that the agent may send and receive messages, modify internal state in response to such messages, and have the ability to perform continuous actions as a side effect.

In some embodiments, an agent may communicate on an entertainment network by way of a communication manager. In some embodiments, there may be one or more communication managers per device, such as communication managers 720, 725, and 730 in FIG. 7. In some embodiments, multiple agents may be managed by a single communication manager, such as, for example, agents 730, 735, and 740 being managed by communication manager 720. In some embodiments, a communication manager is responsible for routing messages to and from the agents that are bound to the communication manager. The process may include delivering messages to other agents that are local to the same network device, multiplexing messages from individual agents onto outgoing connections to agents on remote network devices, and handling broadcast requests. In some embodiments, an agent may be bound to only one communication manager, and a communication manager may be bound to only one network interface.

In some embodiments, a display manager is an agent that manages the resources on a display device. Specifically, the display manager is responsible for granting access to the display resources and screen geometry. In some embodiments, each display device has only one display manager for each related set of I/O devices, such as video output, graphics output, audio output, and user input. In some embodiments, the agent works with a session manager to coordinate the delivery and display of media content at the display device, granting access to the display device resources. In some embodiments, a display manager represents the starting point for a user session and delegate controls to a session manager.

In some embodiments, a session manager is an agent that coordinates a set of media content for an active user. In some embodiments, once selected, a session manager initiates a remote on-screen display session with the corresponding display manager and begins to execute an application program to manage other devices in the network. In some embodiments, a display manager forwards input events to the session manager and grants access rights to its display resources, which a session manager can delegate to other agents, thus allowing the other agents to deliver content to the display. In one example, a display manager may grant access rights to a session manager that executes within a set-top box. The session manager may initiate a remote UI (user interface) session with the display, and allows the user of the network device to select a video to be played from a remote video storage device. In some embodiments, the session manager may pass access rights to a video server, and direct the video server to deliver a media stream to the display. In some embodiments, session managers maintain the states necessary to manage a user's experience in utilizing media content.

Figure 8:
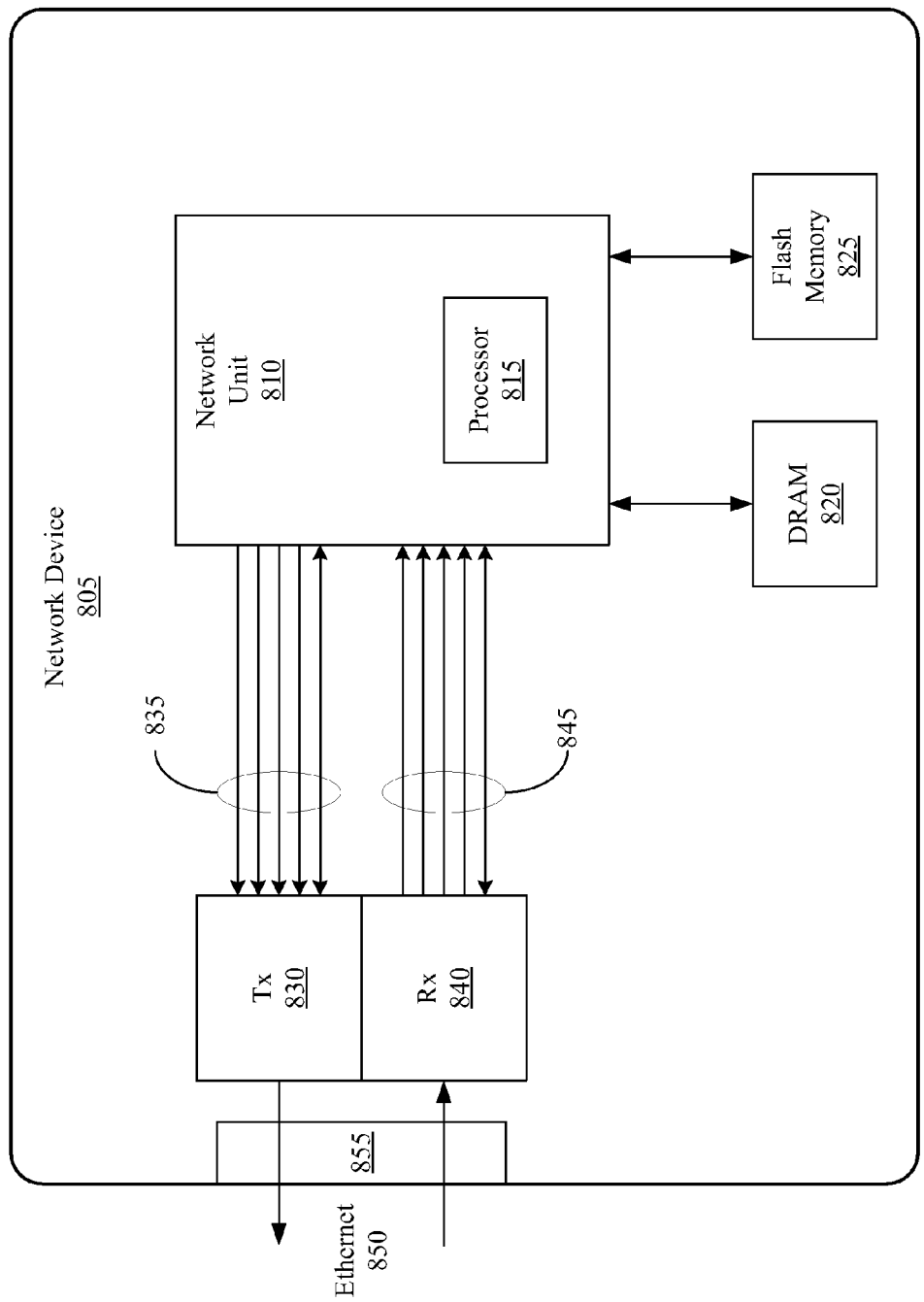
FIG. 8 is an illustration of embodiments of components of a network device.

FIG. 8 is an illustration of embodiments of components of a network device. In this illustration, a network device 805 may be any device in an entertainment network, including, but not limited to, devices illustrated in FIG. 1. For example, the network device may be a television, a set top box, a storage unit, a game console, or other media device. In some embodiments, the network device 805 includes a network unit 810 to provide network functions. The network functions include, but are not limited to, the generation, transfer, storage, and reception of media data streams. The network unit 810 may be implemented as a single system on a chip (SoC) or as multiple components.

In some embodiments, the network unit 810 includes a processor for the processing of data. The processing of data may include the generation of media data streams, the manipulation of media data streams in transfer or storage, and the decrypting and decoding of media data streams for usage. The network device may also include memory to support network operations, such as DRAM (dynamic random access memory) 820 or other similar memory and flash memory 825 or other nonvolatile memory.

The network device 805 may also include a transmitter 830 and/or a receiver 840 for transmission of data on the network or the reception of data from the network, respectively, via one or more network interfaces 855. The transmitter 830 or receiver 840 may be connected to a wired transmission cable, including, for example, an Ethernet cable 850, or to a wireless unit. The transmitter 830 or receiver 840 may be coupled with one or more lines, such as lines 835 for data transmission and lines 845 for data reception, to the network unit 810 for data transfer and control signals. Additional connections may also be present. The network device 805 also may include numerous components for media operation of the device, which are not illustrated here.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus for transmitting a data stream to a recipient device comprising:
    a transmitter configured to transmit the data stream to the recipient apparatus, the data stream including a plurality of data packets;
    a receiver configured to receive a response from the recipient apparatus regarding data packet arrival status; and
    a network unit configured to direct the operation of the transmitter, the network unit to direct the transmitter to maintain the data stream with a constant bandwidth, the constant bandwidth being at least as large as a peak for transmission of the data packets of the data stream, the network unit to direct the transmitter to transmit a sufficient number of additional data packets to maintain the constant bandwidth of the data stream transmitted by the apparatus;
    wherein the network unit is configured to determine that bandwidth for transmission of the data stream by the apparatus is reserved on the network based on the apparatus having successfully transmitted data of the data stream to the recipient apparatus for an admission waiting period, and
    if the network unit determines that the recipient unit has failed to receive data packets for a congestion waiting period, the congestion waiting time period being longer if the network unit has determined that bandwidth for transmission of the data stream is reserved on the network based on successful transmission of data for the admission waiting period than if the network unit has not determined that bandwidth for the transmission of the data stream is reserved, then the network unit is to:
        cease or reduce transmission of the data stream for a resume waiting period, and
        attempt to restart transmission of the data stream after the resume waiting period has expired.

2. The apparatus of claim 1, wherein the additional data packets include one or more null data packets.

3. The apparatus of claim 1, wherein the additional data packets include one or more redundant data packets, retransmitted data packets, or both.

4. The apparatus of claim 1, further comprising a buffer to hold one or more data packets that have been sent to the recipient apparatus, the network unit further to retransmit one or more data packets that the network unit determines have not been received by the recipient apparatus.

5. The apparatus of claim 1, wherein the network unit determines that the one or more or more data packets have not been received by the recipient apparatus based at least in part on the receipt of one or more responses from the recipient apparatus or the lack of receipt of one more response from the recipient apparatus.

6. The apparatus of claim 1, wherein bandwidth reservation is determined by the apparatus without use of a central arbiter or server for the network, and without coordination or communication with any competing network element on the network.

7. The apparatus of claim 1, wherein the network unit is to cease or reduce transmission of the data stream for a second resume waiting period if the attempt to restart transmission of the data stream is not successful.

8. The apparatus of claim 1, wherein the congestion waiting period includes an element that has a random length.

9. The apparatus of claim 1, wherein the apparatus determines the bandwidth reservation without knowledge of the topology or capabilities of the network infrastructure.

10. A method for transmission of data comprising:
transmitting a data stream of data packets from a transmitting device over a network, wherein transmitting the data stream from the transmitting device includes maintaining the data stream at a constant bandwidth at least as large as a peak for transmission of the data packets for the data stream, transmitting the data stream further including transmitting a sufficient number of additional data packets to maintain the constant bandwidth;
determining whether a level of data interference for the network is greater than or equal to a threshold level;
determining that bandwidth for transmission of the data stream by the transmitting device is reserved based on the data stream being transmitted for an admission waiting time without the level of data interference reaching the threshold level; and
if the level of data interference persists at or above the threshold level for at least a time period equal to a congestion time period, wherein the congestion waiting time period is longer if the bandwidth for transmission of the data stream is determined by the transmitting device to be reserved on the network based on successful transmission of data for the admission waiting period than if the bandwidth for the transmission of the data stream is has not been determined to be reserved by the transmitting device, then:
ceasing or reducing the transmission of the data stream by the transmitting device for a resume waiting period, and
attempting by the transmitting device to restart transmission of the data stream after the resume waiting period has expired.

11. The method of claim 10, wherein the congestion waiting time is modified by a randomization interval.

12. The method of claim 11, further comprising establishing the congestion waiting time and randomization interval for the device.

13. A network comprising:
a first network device containing a first network interface, the first network device receiving a request for transmission of a data stream, the data stream comprising a plurality of data packets, the first network device to send the data stream in a constant bandwidth, the constant bandwidth being at least as large as a peak for transmission of the data packets for the data stream, the first network device to transmit a sufficient number of additional data packets to maintain the constant bandwidth; and
a second network device containing a second network interface, the second network device to receive the data stream, the second network device to inform the first network device regarding the receipt of data;
wherein the first network device is configured to determine that bandwidth for transmission of the data stream by the first network device is reserved based on the first network device having successfully transmitted data of the data stream to the second network device for an admission waiting period; and
if the first network unit determines that the second network unit has failed to receive data packets for a congestion waiting period, the congestion waiting time period being longer if the first network unit has determined that bandwidth for transmission of the data stream is reserved on the network based on successful transmission of data for the admission waiting period than if the first network unit has not determined that bandwidth for the transmission of the data stream is reserved, then the first network unit is to:
cease or reduce transmission of the data stream for a resume waiting period, and
attempt to restart transmission of the data stream after the resume waiting period has expired.

14. The network of claim 13, wherein the request for transmission of the data stream is received from a third network device.

15. The network of claim 14, wherein the data stream is comprised of media data.

16. The network of claim 15, wherein the second network device is to present the media data.

17. The network of claim 13, wherein the added data packets include null data packets.

18. The network of claim 13, wherein the second network device is to ignore or drop the null data packets in the data stream.

19. The network of claim 13, wherein the first network device is to retransmit data packets that are not received by the second network device.

20. The network of claim 13, wherein the first network device is unaware of the transmission of other data streams by other network devices in the network, and wherein the first network determines bandwidth reservation without coordination or communication with the other network devices regarding the transmission of data streams.

21. The network of claim 13, wherein the network operates without a server.

22. A method for reserving bandwidth for a data stream in a network comprising:
establishing a constant bandwidth for transmission of a data stream, the data stream comprising a plurality of data packets, wherein the constant bandwidth is at least a peak level of data transmission required for the data stream;
transmitting the data stream from a transmitting device to one or more intended recipients, transmitting the data stream including transmission of enough extra data packets to maintain the constant bandwidth; and
determining that the bandwidth for the transmission of the data stream from the transmitting device to the one or more recipients is reserved based on the transmission of the data stream to the one or more recipients being successful for admission waiting time; and
if transmission of the data stream is unsuccessful for at least a time period equal to a congestion time period, the congestion waiting time period being longer if the bandwidth for transmission of the data stream is determined by the transmitting device to be reserved on the network based on successful transmission of data for the admission waiting period than if the bandwidth for the transmission of the data stream is has not been determined to be reserved by the transmitting device, then:
ceasing or reducing the transmission of the data stream by the transmitting device for a resume waiting period, and
attempting by the transmitting device to restart transmission of the data stream after the resume waiting period has expired.

23. The method of claim 22, wherein the extra data packets to maintain the constant bandwidth include one or more null data packets.

24. The method of claim 22, further comprising retransmitting a data packet that has not been received by an intended recipient.

25. The method of claim 24, further comprising determining that a data packet has not been received by an intended recipient based at least in part on a failure to receive a positive acknowledgement from the intended recipient or on receipt of a negative acknowledgment from the intended recipient.

26. The method of claim 24, wherein the extra data packets to maintain the established bandwidth include the one or more retransmitted data packets.

27. The method of claim 22, further comprising receiving a request for the data stream.

28. The method of claim 22, wherein the congestion waiting period has a component that has a random length.

* * * * *